REVERSIBLE BINARY-CODED COUNTER USING SOLID-STATE DEVICES
Filed July 17, 1964 3 Sheets-Sheet 1
Fig. 4.
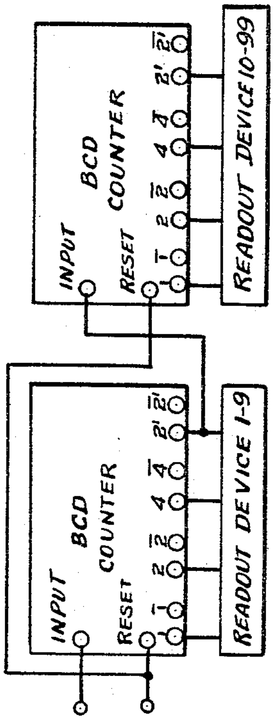
Fig. 3.
| No. | SIGNAL LEVELS $2^0$ | $2^1$ | $2^2$ | $2^1$ |
|---|---|---|---|---|
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 1 | 1 | 1 |
| 9 | 1 | 1 | 1 | 1 |
| 0 | 0 | 0 | 0 | 0 |
Fig. 1.
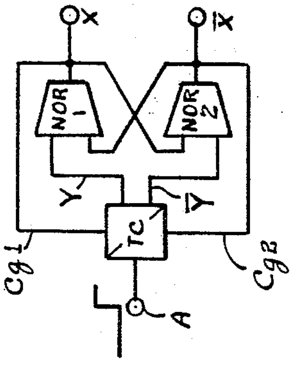
Fig. 2.
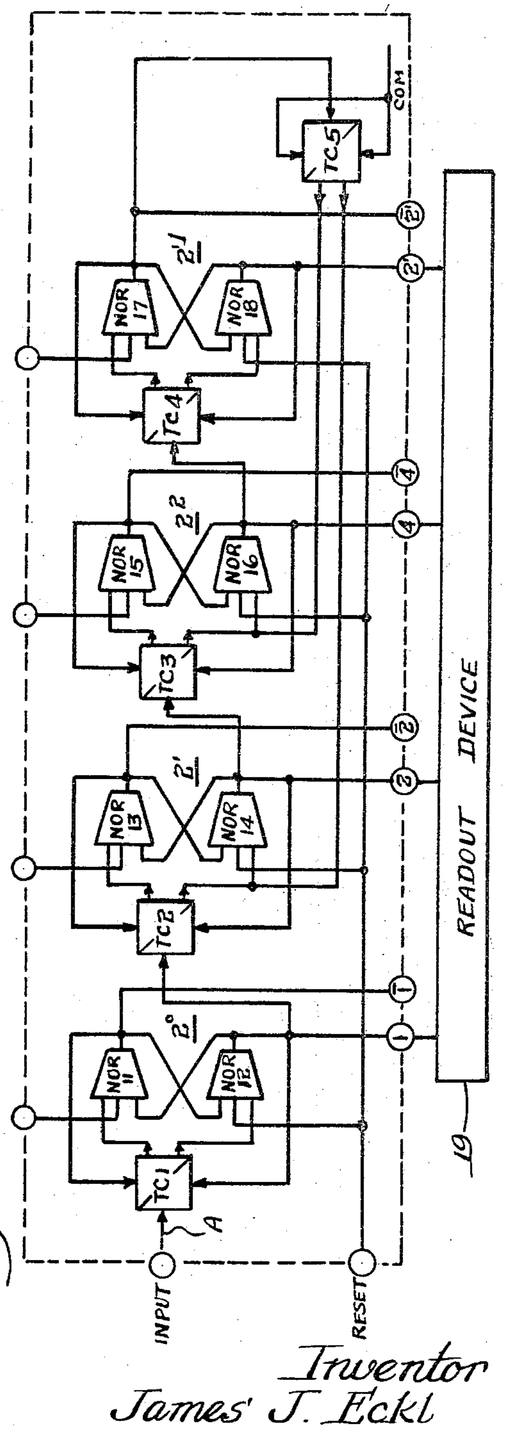
Inventor
James J. Eckl
By Harold J. Rathbun
atty.

REVERSIBLE BINARY-CODED COUNTER USING SOLID-STATE DEVICES

Inventor
James J. Eckl
By: Harold J. Rathbun
Atty.

REVERSIBLE BINARY-CODED COUNTER USING SOLID-STATE DEVICES

Filed July 17, 1964

Inventor
James J. Eckl
By: Harold J. Rathbun
Atty.

United States Patent Office 3,323,067

Patented May 30, 1967

3,323,067
REVERSIBLE BINARY-CODED COUNTER USING SOLID-STATE DEVICES

James J. Eckl, Milwaukee, Wis., assignor to Square D Company, Park Ridge, Ill., a corporation of Michigan Filed July 17, 1964, Ser. No. 383,418
12 Claims. (Cl. 328—44)

This invention relates to binary-coded decimal counters and, more particularly, to a binary-coded decimal counter capable of reversibly counting signals which may occur at varying rates for either forward counting or reverse counting, the circuit being operative to selectively count up and count down to produce an output signal indicative of a net count.

Many types of transistorized counting circuits are known. A most common one of these utilizes transistorized flip-flop circuits in each of which a pair of transistors are cross-connected to provide two stable states of operation in which one of the transistors is conducting while the other is maintained in a non-conductive state. Such prior counters, however, are operative to count in one direction only. The counter of this invention uses but four flip-flop circuits to count both in a forward and a reverse direction and provide a net count in the range from zero through nine.

It is an object of this invention to provide an improved reversible, or forward and reverse, binary-coded decimal counter.

Another object is to provide a binary-coded decimal counter in which the switching is determined by the counting state of the counter and the point of entry of the input pulse.

Another object is to provide a binary-coded decimal counter having a minimum number of stages which are selectively switched to provide an output count signal.

Another object is to provide a binary-coded decimal counter which counts up or down in the same code.

Another object is to provide a reversible binary-coded decimal counter in which some of the transfer circuits function for more than one purpose.

Other objects and advantages of this invention will become apparent from the following specification wherein reference is made to the drawings, in which:

FIG. 1 is a diagrammatic representation of a conventional binary counting stage;

FIG. 2 is a diagrammatic representation of a counter of the prior art capable of counting in one direction only;

FIG. 3 is a chart comparing the binary code used in the counter of this invention with the decimal digits;

FIG. 4 is a diagrammatic representation of decade counters connected in tandem;

Figure 5:
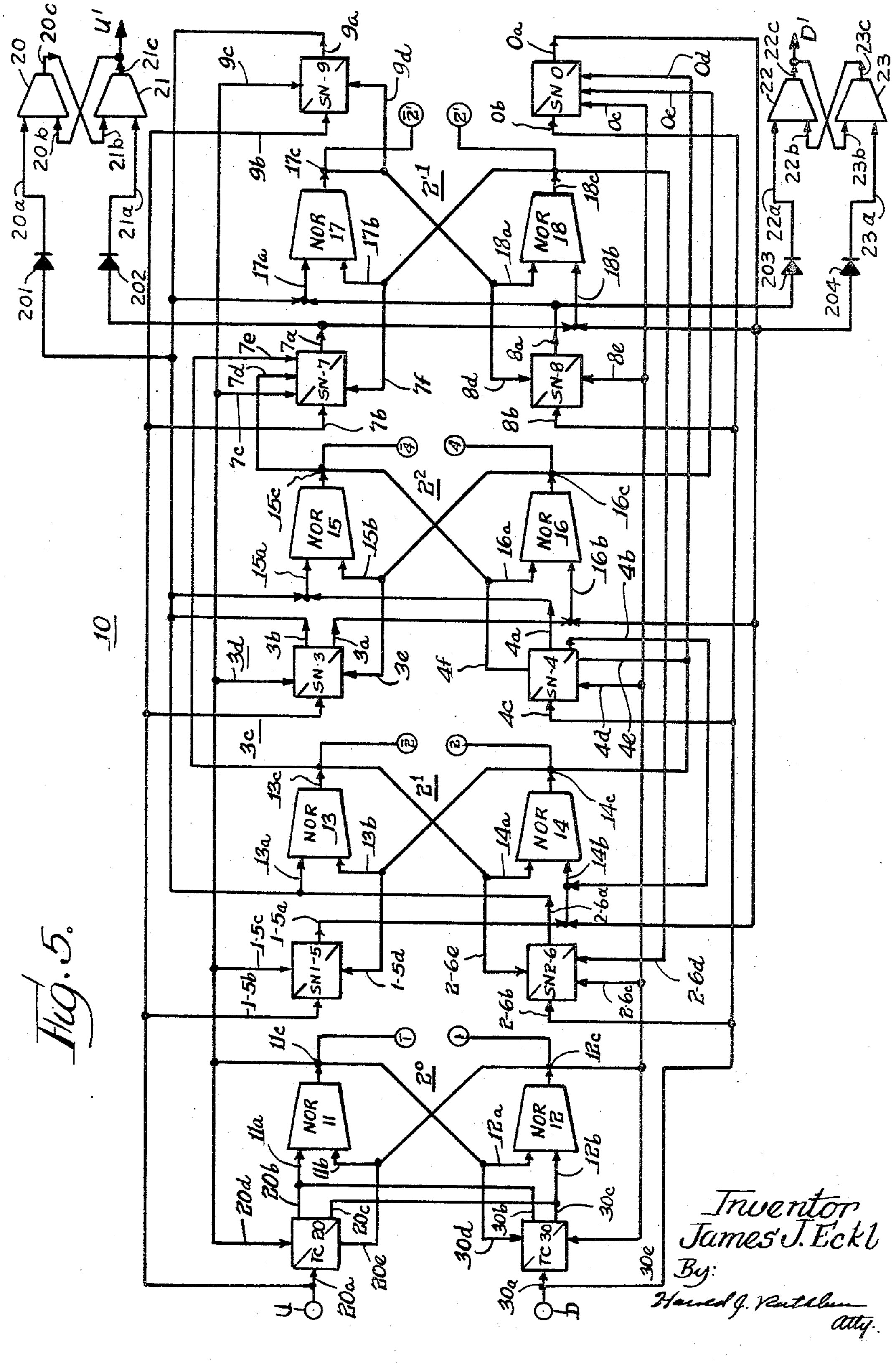
FIG. 5 is a wiring diagram, partially in block form, of the counter of this invention.

Among the wide variety of electromechanical and electronic binary counters that have been developed, a commonly used type is formed by connecting a number of stages of multivibrator or flip-flop circuits in tandem so that each stage, other than the first stage, shifts from one of its bistable states to the other of its bistable states only when the preceding stage has shifted from one state to the other twice. This provides the well known binary relationship of $2^0$, $2^1$, $2^2$ . . . $2^n$, where $n$ is the number of stages.

Each stage of this type of counter of ten comprises a pair of NOR logic elements and a transfer circuit TC as shown in FIG. 1. Referring to FIG. 1, the output of a NOR 1 is connected to the input of a NOR 2 and the output of the NOR 2 is connected to the input of the NOR 1 thereby to form a flip-flop circuit, the operation of which is well known in the art so that a detailed description is not necessary. The flip-flop circuit thus formed has two bistable states wherein one or the other of the NOR elements only is conductive with the conductive NOR element providing a "0" signal and the non-conductive NOR element providing a "1" signal which is negative with respect to the "0" signal.

The transfer circuit TC of FIG. 1 has a single input A, two outputs Y and $\bar{Y}$, and two feedback paths or control gates Cg1 and Cg2 and functions to provide positive voltage signals at its outputs alternately to render the NOR 1 or the NOR 2 non-conductive. It should be noted that the transfer circuit TC differs from a NOR element in that it provides a positive signal to render a NOR element non-conductive instead of a negative signal to render a NOR element conductive. The operation and description of the transfer circuit TC and the NORS 1 and 2 is clearly set forth in Meyer and Eckl Patent No. 3,243,652 which issued on Mar. 29, 1966 to the assignee of the present invention.

In the operation of the counter stage of FIG. 1, when a negative "1" to a "0" control signal is applied to the input A of the transfer circuit TC, a positive voltage appears at the one of the two outputs Y and Y associated with the one of the two control gates Cg1 or Cg2 connected to the one of the NOR elements NOR 1 or NOR 2 which is conductive at that instant. This is because a "0" signal fed back from the conductive NOR element does not interfere with the effect of a control signal at the input A of the transfer circuit TC whereas a "1" signal fed back from the non-conductive NOR element blocks a signal at the other output of the transfer circuit TC. Thus, the transfer circuit TC responds to repeated negative "1" to "0" signal changes at its input to provide positive voltage output signals at its outputs alternately which are applied to the respective inputs of the NOR 1 and the NOR 2 thereby to shift the state of the counter stage.

It is apparent then that a plurality of NOR flip-flop circuits with appropriate transfer circuits can be arranged to form a binary-coded counter such as shown in FIG. 2, wherein one of the outputs of one of the NOR elements of each flip-flop circuit, except the last, is connected to the input of a transfer circuit for the next succeeding stage. It is to be noted that the binary-coded counter of FIG. 2 provides a decimal readout having only ten outputs or signal level states which correspond to decimal delineations instead of the usual sixteen outputs for a standard four-stage binary counter. This is accomplished by the use of an additional transfer circuit to "skip" six counts at a predetermined signal level state in the counting sequence in a manner hereinafter described.

The binary-coded decimal counter of FIG. 2 comprises four stages $2^0$, $2^1$, $2^2$, and $2'^1$. The first stage $2^0$ includes a pair of NOR elements NOR 11 and NOR 12 and a transfer circuit TC1. The output terminals of the NOR 11 and NOR 12 are designated as $\bar{1}$ and 1, respectively. Similarly, the second stage $2^1$ comprises a transfer circuit TC2 and a pair of NOR elements NOR 13 and NOR 14 having respective outputs $\bar{2}$ and 2; the third stage $2^2$ comprises a transfer circuit TC3 and a pair of NOR elements NOR 15 and NOR 16 having respective outputs $\bar{4}$ and 4; and the fourth stage $2'^1$ comprises a transfer circuit TC4 and a pair of NOR elements NOR 17 and NOR 18 having respective outputs $\bar{2}'$ and $2'$. The output 1 is connected to the input of the transfer circuit TC2; the output 2 is connected to the input of the transfer circuit TC3; the output 4 is connected to the input of the transfer circuit TC4; and the output $\bar{2}'$ is connected to the input of a transfer circuit TC5 which has one of its two outputs connected to an input of the NOR 16 of the stage $2^2$ and the other connected to an input of the NOR 14 of the stage $2^1$.

If the outputs 1, 2, 4 and 2′ for the four stages are considered to be the terminals of the counter, then the various combinations of signal levels at these terminals may be tabulated as in FIG. 3 for each of the decimal digits from zero through nine. In the table, a "0" represents a lack of a signal which occurs when the associated NOR is conductive and a "1" represents a negative signal which occurs when the associated NOR is non-conductive. Initially, the NORS 12, 14, 16 and 18 are conductive so that a "0" signal is present at each of the output terminals 1, 2, 4, and 2′. This may correspond to the decimal digit 0 as indicated in FIG. 3.

If a "1" to "0" signal change is presented at the input A of the transfer circuit TC1, the NOR 12 is rendered non-conductive and the NOR 11 is rendered conductive and the output at the terminal 1 changes from a "0" signal to a "1" signal. The signals now at the several outputs correspond to the decimal digit 1, as shown in FIG. 3. The next succeeding "1" to "0" signal change at the input A of the transfer circuit TC1 renders the NOR 12 conductive and the NOR 11 non-conductive. The resulting change from a "1" to a "0" signal at the output 1 of the NOR 12 causes a positive voltage at the lower output of the transfer circuit TC2 to render the NOR 14 non-conductive thereby to produce a "1" signal at the terminal 2. The signals now at the several outputs correspond to the decimal digit 2, as shown in FIG. 3.

Succeeding signal changes of "1" to "0" at the input A of transfer circuit TC1 in the counter of FIG. 2 further shift the respective stages successively in the manner indicated in the table of FIG. 3. The skip of six counts previously mentioned takes place between the decimal digits 7 and 8. This is accomplished by connecting the output of the NOR 17 of the stage $\mathbf{2'^1}$ to the input of the transfer circuit TC5. When the output of the NOR 17 changes from "1" to "0," positive signals appear at both of the outputs of the transfer circuit TC5 because the control gates thereof are tied to a common or zero potential points. These positive signals are applied to the inputs of the NORS 14 and 16, respectively, to maintain them non-conductive, thereby causing "1" signals to remain at both the output terminals 2 and 4. Thus, the several outputs now correspond to the decimal digit 8 of FIG. 3. The next succeeding signal change from "1" to "0" at the input A of the transfer circuit TC1 causes the NOR 12 to become non-conductive so that the several outputs correspond to the decimal digit 9. With the next succeeding signal change at the input A, the counter is shifted back to its initial state corresponding to the decimal digit zero or 10.

As shown in FIG. 2, a common reset circuit may be provided for the NORS 12, 14, 16, and 18, and individual set circuits may be provided for the respective NORS 11, 12, 13 and 15.

The counter of FIG. 2 therefore counts upwardly from 0 to 9 and any suitable readout device 19, such as a cold-cathode discharge tube with multiple cathodes, can be utilized to give a visual indication of the counting level as desired. One or more binary-coded decimal decade counters such as shown in FIG. 2 can be connected in tandem to provide for the counting above 10, viz., 10–99, 100–999, etc. FIG. 4 shows the manner of connecting such counter decades wherein the terminal 2′ of the counter for a lower decade is connected to the input for the next higher decade counter, thereby giving a counting capability of 0 to 999 or more.

From the foregoing description, it is obvious that the counter of FIG. 2 is capable of counting input signals in a forward direction; that is, it is an "up" counter only. The present invention relates to the binary-coded decimal decade counter 10 of FIGS. 5 and 7 which is not only capable of counting "up," but also is capable of counting "down"; that is, capable of adding and subtracting from the accumulated total. The adding and subtracting may be done in any sequence desired. "Up-down" counting may be employed advantageously in inventory applications, in instances where signals of a known frequency rate are compared with signals of an unknown frequency rate, and in many other applications.

A wiring diagram, using blocks to show the several transfer circuits, of an "up-down" counter 10 in accordance with this invention is shown in FIG. 5. The counter 10, like the counter of FIG. 2, has four stages $\mathbf{2^0}$, $\mathbf{2^1}$, $\mathbf{2^2}$, and $\mathbf{2'^1}$ and each stage includes a pair of NOR elements connected as a flip-flop circuit as previously described in connection with FIG. 2. The stage $\mathbf{2^0}$ includes the NOR elements NOR 11 and NOR 12; the stage $\mathbf{2^1}$ includes the NOR elements NOR 13 and NOR 14; the stage $\mathbf{2^2}$ includes the NOR elements NOR 15 and NOR 16, and the stage $\mathbf{2'^1}$ includes the NOR elements NOR 17 and NOR 18.

The NOR 11 has a pair of inputs **11*a* and 11*b* and an output 11*c* which constitutes the reference terminal $\bar{1}$. Similarly, the NOR 12 has a pair of inputs 12*a* and 12*b* and an output 12*c* which constitutes the reference terminal 1; the NOR 13 has a pair of inputs 13*a* and 13*b* and an output 13*c* which constitutes the reference terminal $\bar{2}$, the NOR 14 has a pair of inputs 14*a* and 14*b* and an output 14*c* which constitutes the reference terminal 2; the NOR 15 has a pair of inputs 15*a* and 15*b* and an output 15*c* which constitutes the reference terminal $\bar{4}$; the NOR 16 has a pair of inputs 16*a* and 16*b* and an output 16*c* which constitutes the reference terminal 4; the NOR 17 has a pair of inputs 17*a* and 17*b* and an output 17*c* which constitutes the reference terminal $\bar{2}'^1$; and the NOR 18 has a pair of inputs 18*a* and 18*b* and an output 18*c* which constitutes the reference terminal 2′**.

A pair of conventional transfer circuits TC20 and TC30 provide the inputs of the stage $\mathbf{2^0}$. The transfer circuit TC20 has an input **20*a* connected to a source U of signals which are to be counted "up," or added to the accumulated total, while the transfer circuit TC30 has an input 30*a* connected to a source D of signals which are to be counted "down," or subtracted from the accumulated total. The transfer circuit TC20 has an output 20*b* connected to the input 11*a* of the NOR 11 with an associated control gate 20*d* connected to the output 11*c* of the NOR 11. The transfer circuit TC20 also has an output 20*c* connected to the input 12*b* of the NOR 12 with an associated control gate 20*e* connected to the output 12*c* of the NOR 12. Likewise, the transfer circuit TC30 has an output 30*b* and a control gate 30*d* connected respectively to the input 11*a* and the output 11*c* of the NOR 11 and an output 30*c* and a control gate 30*e* connected respectively to the input 12*b* and the output 12*c* of the NOR 12**.

In addition, multiple gated storage networks according to the present invention provide inputs to the respective NOR elements of the counter stages $\mathbf{2^1}$, $\mathbf{2^2}$, and $\mathbf{2'^1}$. As will become hereinafter apparent, networks SN1–5, SN3, SN7 and SN9 function and provide positive signals to the various NORS when the counter is counting upwardly and networks SN2–6, SN4, SN8 and SN0 function to provide positive voltage signals when the counter is counting downwardly.

The network SN1–5 in the stage $\mathbf{2^1}$ has an output **1–5*a* connected to the input 14*b* of the NOR 14 and three inputs 1–5*b*, 1–5*c*, and 1–5*d*. The input 1–5*b* is connected to the source U of the signals to be counted "up"; the input 1–5*c* is connected to the terminal $\bar{1}$ of the stage $\mathbf{2^0}$; and the third input 1–5*d* is connected to the terminal 2** of the stage $\mathbf{2^1}$.

The network SN2–6 has an output **2–6*a* connected to the input 13*a* of the NOR 13 and four inputs 2–6*b*, 2–6*c*, 2–6*d*, and 2–6*e*. The input 2–6*b* is connected to the source D of signals to be counted "down"; the input 2–6*c* is connected to the terminal 1 of the stage $2^0$; the input 2–6*d* is connected to the terminal 2′ of the stage $2'^1$; and the fourth input 2–6*e*** is connected to the terminal $\bar{2}$ of the stage $2^1$.

The network SN3 has an output **3*a* connected to the input 16*b* of the NOR 16 and an output 3*b* connected to the input 13*a* of the NOR 13. The network SN3 has three inputs 3*c*, 3*d*, and 3*e*. The input 3*c* is connected to the source U of the signals to be counted "up"; the input 3*d* is connected to the terminal $\bar{1}$ of the stage $2^0$, and the input 3*e* is connected to the terminal 4** of the stage $2^2$.

The network SN4 has an output **4*a* connected to the input 15*a* of the NOR 15 in the stage $2^2$ and an output 4*b* connected to the input 14*b* of the NOR 14. The network SN4 has four inputs 4*c*, 4*d*, 4*e*, and 4*f*. The input 4*c* is connected to the source D of signals to be counted "down"; the input 4*d* is connected to the terminal 1 of the stage $2^0$; the input 4*e* is connected to the terminal 2 of the stage $2^1$; and the input 4*f*** is connected to the terminal $\bar{4}$ of the stage $2^2$.

The network SN7 has an output **7*a* connected to the input 18*b* of the NOR 18 and five inputs 7*b*, 7*c*, 7*d*, 7*e*, and 7*f*. The input 7*b* is connected to the source U of signals to be counted "up"; the input 7*c* is connected to the terminal $\bar{1}$ of the stage $2^0$; the input 7*d* is connected to the terminal $\bar{4}$ of the stage $2^2$; the input 7*e* is connected to the terminal $\bar{2}$ of the stage $2^1$; and the input 7*f* is connected to the terminal 2′** of the stage $2'^1$.

The network SN8 has an output **8*a* connected to the input 17*a* of the NOR 17 and three inputs 8*b*, 8*c* and 8*d*. The input 8*b* is connected to the source D of signals to be counted "down"; the input 8*c* is connected to the terminal 1 of the stage $2^0$; and the input 8*d*** is connected to the terminal $\bar{2}'$ of the stage $2'^1$.

The network SN9 has an output **9*a* connected to the input 17*a* of the NOR 17, to the input 15*a* of the NOR 15, and also to the input 13*a* of the NOR 13. The network SN9 has three inputs 9*b*, 9*c* and 9*d*. The input 9*b* is connected to the source U of the signals to be counted "up"; the input 9*c* is connected to the terminal $\bar{1}$ of the stage $2^0$; and the input 9*d*** is connected to the terminal $\bar{2}'$ of the state $2'^1$.

The network SN0 has an output **0*a* connected to the input 18*b* of the NOR 18, to the input 16*b* of the NOR 16, and also to the input 14*b* of the NOR 14. The network SN0 also has four inputs 0*b*, 0*c*, 0*d* and 0*e*. The input 0*b* is connected to the source D of signals to be counted "down"; the input 0*c* is connected to the terminal 1 of the stage $2^0$; the input 0*d* is connected to the terminal 2 of the stage $2^1$; and the input 0*e* is connected to the terminal 4** of the stage $2^2$.

Thus it is seen that the binary counter of FIG. 5 differs from the prior art counter as illustrated in FIG. 2 in a number of respects. Completely separate inputs are provided to the multiple gated storage networks when counting "up" and to the multiple gated storage networks when counting "down." All four stages of the counter may switch or shift their bistable states at one time and not in sequence, as is the case for the counter of FIG. 2. This switching depends upon the specific counting state of the counter 10 and whether the next succeeding input signal is applied to the "up-count" or "down-count" input terminal U or D.

Figures 6, 7:
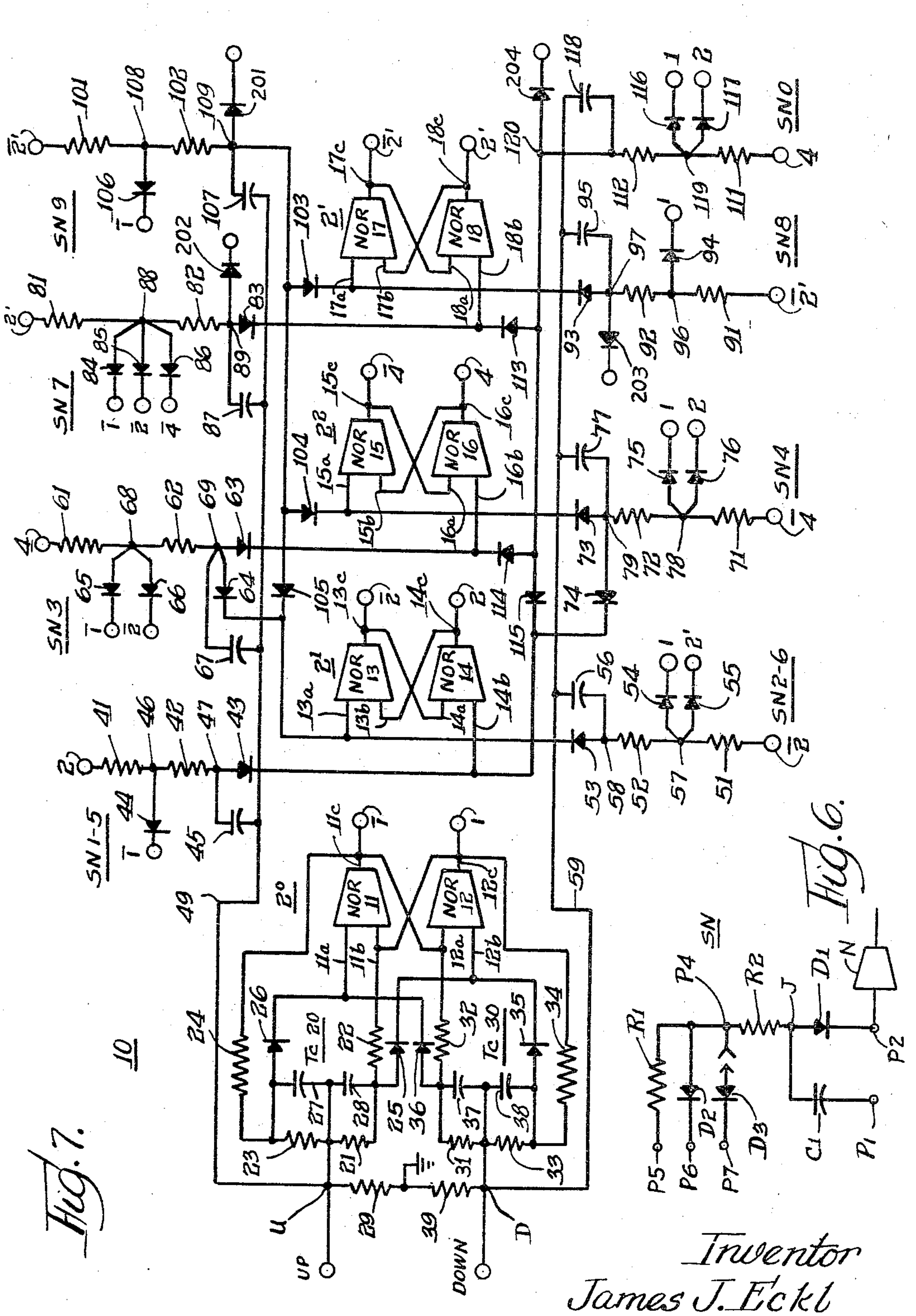
FIG. 6 is a wiring diagram of a representative one of the transfer circuits or storage networks used in the counter of FIG. 5; and, FIG. 7 is a complete wiring diagram of the counter of this invention.

Before further undertaking a description of the various multiple gated storage networks, hereinafter simply called "networks," which are identified by the letters SN and a numerical index in FIG. 5, the basic circuitry thereof as shown in FIG. 6 will be explained.

In FIG. 6, a capacitor C1 is connected between a junction J and an input terminal P1. The junction J is connected through a diode D1 to an output terminal P2. The diode D1 is connected to conduct positive voltage signals from the junction J to the terminal P2 and block signals in the reverse direction. The junction J is also connected through a resistor R2 to a junction P4 which in turn is connected through a resistor R1 to an input terminal P5 and through a diode D2 to an input terminal P6. The diode D2 is connected in its circuit to conduct current from the junction P4 to the terminal P6 and block current flow in the reverse direction. If desired, a plurality of additional input terminals each of which is represented by an input terminal P7 may be connected through individual diodes represented as a diode D3 to the junction P4 so that the diodes represented by the diode D3 will operate in the circuit shown in FIG. 6 in the same manner as the diode D2.

It will be seen that the output terminal P2 is connected as an input to a NOR N. The input terminals P1, P5 and P6 are connected to a suitable source of "0" and "1" signals to cause switching of the NOR N as follows. When the input signal to terminal P1 is "0," the capacitor C1 is charged when the terminal P5 has a "1" signal impressed thereon by a circuit which permits current flow from terminal P1 through capacitor C1 to terminal P5. However, any subsequent change in the signal at terminal P1 from "0" to "1" during intervals when the capacitor C1 is thus charged will be ineffective to switch NOR N because the diode D1 blocks the transmission of the switching signal to terminal P2. When the signal at the terminal P1 is "1" and the terminals P5, P6, and P7 have the proper combination of input signals applied thereto, the capacitor C1 will cause NOR N to switch to a nonconductive state to supply a "1" output signal. When the terminal P5 has a "1" signal impressed thereon, capacitor C1 will not charge because terminals P5 and P1 are at the same potential and the diodes D2 and D3 block any charging current flow from the terminals P6 and P7 to terminal P1. Thus the capacitor will charge only during an interval when terminal P5 has a "0" signal and terminal P1 has a "1," providing both of the terminals P6 and P7 have the proper input signal impressed thereon. When either of the terminals P6 or P7 has a "1" signal impressed thereon, the diodes D2 or D3 conduct current from the terminal P5 to the terminal P6 or P7 which has a "1" signal impressed thereon so that the signal at junction P4 becomes "1" thus preventing capacitor C1 from being charged. Thus only during intervals when terminal P1 has a "1" input signal and terminals P5, P6 and P7 each have a "0" will the capacitor C1 be charged in a direction to make the junction J side thereof positive relative to the terminal P1 side of capacitor C1. When the capacitor is thus charged, any subsequent change in the input signal at terminal P1 from "1" to "0" will cause a momentary positive voltage pulse to be transmitted from the capacitor C1 through the diode D1 to the NOR N to switch the NOR N so its output signal becomes "1."

FIG. 7 is a complete wiring diagram of the binary coded decade counter of FIG. 5. For the sake of clarity and to facilitate the understanding of the detailed description of the sequence of operation, some of the terminals of the storage networks SN1–5 to SN0 in FIG. 7 are identified with the particular terminals of the counter stages to which they are connected rather than showing the actual wire connections therebetween.

In FIG. 7, a terminal U provides an input to the transfer circuit TC20 and a terminal D provides an input to the transfer circuit TC30. The transfer circuit TC20 includes a pair of resistors 21 and 22 connected in series with each other between the terminal U and the input **11*b* of the NOR 11. Another pair of resistors 23 and 24 are connected in series with each other between the terminal U and the output 11*c* of the NOR 11. A diode 25 is connected between the junction of the resistors 21 and 22 and the input 12*b* of the NOR 12, and a diode 26 is connected between the junction of resistors 23 and 24 and the input 11***a* of the NOR 11. Capacitors 27 and 28 are connected in parallel with the resistors 23 and 21, respectively. A resistor 29 is connected between the terminal U and ground.

Similarly, in the transfer circuit TC30, a pair of resistors 31 and 32 are connected in series with each other between the terminal D and the input 12*a* of the NOR 12 and a pair of resistors 33 and 34 are connected in series with each other between the terminal D and the output 12*c* of the NOR 12. A diode 36 is connected between the junction of the resistors 31 and 32 and the input 11*a* of the NOR 11 while a diode 35 is connected between the junction of the resistors 33 and 34 and the input 12*b* of the NOR 12. Capacitors 37 and 38 are connected in parallel with the resistors 31 and 33, respectively. A resistor 39 is connected between the terminal D and ground.

The network SN1–5 includes a pair of resistors 41 and 42, a pair of diodes 43 and 44, and a capacitor 45. The resistors 41 and 42 and the diode 43 are connected in series with each other between the input 14*b* of the NOR 14 and the reference terminal 2 of the stage $2^1$. A junction 46 is located between the resistors 41 and 42 and a junction 47 is located between the resistor 42 and the diode 43. The diode 44 is connected between the junction 46 and the terminal $\bar{1}$ of the stage $2^0$. The capacitor 45 is connected between the junction 47 and the terminal U by a conductor 49.

In like manner, the network SN2–6 includes a pair of resistors 51 and 52, a plurality of diodes 53, 54 and 55, and a capacitor 56. The resistors 51 and 52 and the diode 53 are connected in series with each other between the input 13*a* of the NOR 13 and the terminal $\bar{2}$ of the stage $2^1$. A junction 57 is located between the resistors 51 and 52 and a junction 58 is located between the resistor 52 and the diode 53. The diode 54 is connected between the junction 57 and the terminal 1 of stage $2^0$ and the diode 55 is connected between the junction 57 and the terminal 2′ of the stage $2'^1$. The capacitor 56 is connected between the junction 58 and the terminal D by a conductor 59.

The network SN3 includes a pair of resistors 61 and 62, a plurality of diodes 63, 64, 65, and 66, and a capacitor 67. The resistors 61 and 62 and the diode 63 are connected in series with each other between the input 16*b* of the NOR 16 and the terminal 4 of the stage $2^2$. A junction 68 is located between the resistors 61 and 62 and a junction 69 is located between the resistor 62 and the diode 63. The diode 64 is connected between the junction 69 and the input 13*a* of the NOR 13. The diode 65 is connected between the junction 68 and the terminal $\bar{1}$ of the stage $2^0$ and the diode 66 is connected between the junction 68 and the terminal $\bar{2}$ of the stage $2^1$. The capacitor 67 is connected between the junction 69 and the conductor 49.

The network SN4 includes a pair of resistors 71 and 72, a plurality of diodes 73, 74, 75, and 76, and a capacitor 77. The resistors 71 and 72 and the diode 73 are connected in series with each other between the input 15*a* of the NOR 15 and terminal $\bar{4}$ of the stage $2^2$. A junction 78 is located between the resistors 71 and 72 and a junction 79 is located between the resistor 72 and the diode 73. The diode 74 is connected between the junction 79 and the input 14*b* of the NOR 14 and the capacitor 77 is connected between the junction 79 and the conductor 59. The diode 75 is connected between the junction 78 and the terminal 1 of the stage $2^0$ and the diode 76 is connected between the junction 78 and the terminal 2 of the stage $2^1$.

The network SN7 includes a pair of resistors 81 and 82, a plurality of diodes 83, 84, 85 and 86, and a capacitor 87. The resistors 81 and 82 and the diode 83 are connected in series with each other between the input 18*b* of the NOR 18 and the terminal 2′ of the stage $2'^1$. A junction 88 is located between the resistors 81 and 82 and a junction 89 is located between the resistor 82 and the diode 83. The diode 84 is connected between the junction 88 and the terminal $\bar{1}$ of the stage $2^0$, the diode 85 is connected between the junction 88 and the terminal $\bar{2}$ of the stage $2^1$, and the diode 86 is connected between the junction 88 and the terminal $\bar{4}$ of the stage $2^2$. The capacitor 87 is connected between the junction 89 and the conductor 49.

The network SN8 includes a pair of resistors 91 and 92, a pair of diodes 93 and 94, and a capacitor 95. The resistors 91 and 92 and the diode 93 are connected in series with each other between the terminal $\bar{2}'$ of the stage $2'^1$ and the input 17*a* of the NOR 17. A junction 96 is located between the resistors 91 and 92 and a junction 97 is located between the resistor 92 and the diode 93. The diode 94 is connected between the junction 96 and the terminal 1 of the stage $2^0$. The capacitor 95 is connected between the junction 97 and the conductor 59.

The network SN9 includes a pair of resistors 101 and 102, a plurality of diodes 103, 104, 105 and 106, and a capacitor 107. The resistors 101 and 102 and the diode 103 are connected in series with each other between the terminal $\bar{2}'$ of the stage $2'^1$ and the input 17*a* of the NOR 17. A junction 108 is located between the resistors 101 and 102 and a junction 109 is located between the resistor 102 and the diode 103. The diode 104 is connected between the junction 109 and the input 15*a* of the NOR 15. The diode 105 is connected between the junction 109 and the input 13*a* of the NOR 13. The diode 106 is connected between the junction 108 and the terminal $\bar{1}$ of the stage $2^0$. The capacitor 107 is connected between the junction 109 and the conductor 49.

The network SN0 includes a pair of resistors 111 and 112, a plurality of diodes 113, 114, 115, 116 and 117, and a capacitor 118. The resistors 111 and 112 and the diode 113 are connected in series with each other between the terminal 4 of the stage $2^2$ and the input 18*b* of the NOR 18. A junction 119 is located between the resistors 111 and 112 and a junction 120 is located between the resistor 112 and the diode 113. The diode 114 is connected between the junction 120 and the input 16*b* of the NOR 16, and the diode 115 is connected between the junction 120 and the input 14*b* of the NOR 14. The diode 116 is connected between the junction 119 and the terminal 1 of the stage $2^0$ and the diode 117 is connected between the junction 119 and the terminal 2 of the stage $2^1$. The capacitor 118 is connected between the junction 120 and the conductor 59.

In describing the counting operation of the counter 10, it is assumed, as was done in connection with FIG. 2, that in the initial state the NOR elements 12, 14, 16 and 18 are in the conductive state, causing "0" signals to be present at the terminals 1, 2, 4 and 2′, while the NOR elements 11, 13, 15 and 17 are in the non-conductive state causing "1" signals to be present at the terminals $\bar{1}$, $\bar{2}$, $\bar{4}$, and $\bar{2}'$. This corresponds to the decimal digit zero as indicated in the table of FIG. 3.

During standby conditions before signals to initiate counting in an upward direction are applied to terminal U, the signal at terminal U is "0." Since NOR 11 is non-conductive and NOR 12 is conductive, the "1" output signal of NOR 11 is impressed through the resistor 24 to charge capacitor 27. Also when terminal U has a "0" signal during standby conditions, NOR 12 has a "0" output signal so the capacitor 28 does not receive a charging potential. When the signal at terminal U changes from "0" to "1" to condition the circuits for a count in the upward direction, the capacitor 27 discharges through resistor 23 without any effect on the circuit as the diode 26 prevents the discharge of the capacitor 27 through the NOR 11. Also during the interval when the signal at terminal U continues to be "1," the capacitor 28 charges through the resistor 22 because the output signal of the NOR 12 is "0." The charging of capacitor 28 is in a direction which causes the resistor 22 side of the capacitor to have a positive potential relative to the terminal U side of the capacitor 28. When the input signal at terminal U changes from "1" to "0," thereby completing the count signal, the charge on the capacitor 28 is supplied as a positive voltage signal through the diode 25 to the input terminal 12*b* of the NOR 12 which causes the NOR 12 to be non-conductive so its output becomes "1" which is supplied to the input terminal 11*b* of the NOR 11 so its output signal changes to "0." The terminal 1 is now presented with a "1" signal from the NOR 12 which corresponds to the decimal digit one in the table of FIG. 3.

During the interval when the input "1" signal at the terminal U was present, a "1" signal was also fed by the conductor 49 to each of the capacitors 45, 67, 87 and 107. None of these capacitors can charge however, because NOR 11 has not switched so that a "1" signal at terminal $\bar{1}$ is supplied through diodes 44, 65, 84 and 106 to the respective junctions 46, 68, 88 and 108.

When the NOR 11 switches to its conductive state and the NOR 12 becomes non-conductive, the junction 46 is at a zero potential since both the diode 44 and the resistor 41 are connected to terminals having a "0" signal. Prior to a second upward directional count signal at terminal U, when NOR 12 is non-conductive and NOR 11 is conductive, the "1" output signal of NOR 12 is impressed through the resistor 22 to charge capacitor 28 in a direction to cause the resistor 22 side to have a negative potential. Also when terminal U has a "0" signal prior to the second upward count signal, NOR 11 has a "0" output signal so that the capacitor 27 does not receive a charging potential. When the signal at terminal U changes from "0" to "1" to condition the circuits for a second count in the upward direction, the capacitor 28 discharges through resistor 21 without any effect on the circuit because the diode 25 prevents the discharge of the capacitor 28 through the NOR 12. Also during the interval when the signal at terminal U continues to be "1," the capacitor 27 charges through the resistor 24 because the output signal of the NOR 11 is "0." The charging of capacitor 27 is in a direction which causes the resistor 24 side of the capacitor to have a positive potential relative to the terminal U side of the capacitor 27. When the input signal at terminal U changes from "1" to "0," thereby completing the second count signal, the charge on the capacitor 27 is supplied as a positive voltage signal through the diode 26 to the input terminal 11*a* of the NOR 11 to be non-conductive so its output becomes "1" which is supplied to the input terminal 12*a* of the NOR 12 so its output signal changes to "0."

Also when the signal at terminal U changes from "0" to "1" at the beginning of the second count in the upward direction, the capacitor 45 charges because terminals $\bar{1}$ and 2 each have a "0" impressed thereon. However, the capacitors 67, 87 and 107 do not become charged as the signal at terminals $\bar{2}$ and $\bar{2}'$ are "1." When the signal at terminal U changes from "1" to "0" to complete the second upward directional count simultaneously with the switching of NORS 11 and 12, the charge on capacitor 45 is conducted by the diode 43 to the input terminal 14*b* of the NOR 14, and causes NOR 14 to become non-conductive so its output changes to "1" which causes the NOR 13 to become conductive and have a "0" output signal. Thus, because the output signals at terminals 1 and 2 of stages $2^0$ and 2′ are "0" and "1," the counter output corresponds to the decimal digit two count as indicated in the table of FIG. 3.

From the foregoing it is apparent that when the signal at terminal U changes from "0" to "1," one of the capacitors 27 and 28 is charged to condition the circuit for switching NORS 11 and 12 when the signal at terminal U goes from "1" to "0." Also when the signal at terminal U is "0," none of the capacitors 45, 67, 87 and 107 will be provided with an effective charge. However, when the signal at terminal U is "1," any one of the capacitors 45 67, 87 and 107 may be charged with a useful charge depending upon the signals which are supplied to the remaining inputs of networks SN1–5, SN3, SN7 and SN9.

Thus at the end of the decimal count two, the signals at the terminals $\bar{1}$, 2, $\bar{4}$ and $\bar{2}'$ will be "1" and the signals at the terminals 1, $\bar{2}$, 4 and 2′ will be "0." When the counter receives a signal change at the terminal U from "0" to "1" to begin the third decimal count, none of the capacitors 45, 67, 87 and 107 charge because terminal $\bar{1}$ has a "1" signal impressed thereon. Therefore none of the NORS 13–18 switch when the NORS 11 and 12 switch as the signal at the terminal U changes from "1" to "0" to complete the third decimal count. At the end of the third decimal count the signals at the terminals 1, 2, $\bar{4}$, and $\bar{2}'$ are "1" and the signals at the terminals $\bar{1}$, $\bar{2}$, 4 and 2′ are "0."

When a signal change at the terminal U from "0" to "1" occurs to begin the fourth decimal count, the capacitor 67 charges because the terminals $\bar{1}$, $\bar{2}$ and 4 each have a "0" signal. The capacitors 45, 87 and 107 are not charged because the terminals 2, $\bar{4}$ and $\bar{2}'$ each have a "1" signal. Thus when the signal at the terminal U changes from "1" to "0" to complete the fourth decimal count, the capacitor 67 will supply a positive signal through the diode 64 to the input 13*a* of the NOR 13 and through the diode 63 to the input 16*b* of the NOR 16 so that the NORS 13, 14, 15 and 16 switch simultaneously with the NORS 11 and 12 to provide a "1" signal at the terminals $\bar{1}$, $\bar{2}$, 4 and $\bar{2}'$ and a "0" signal at the terminals 1, 2, $\bar{4}$ and 2′.

When the counter receives a signal change at the terminal U from "0" to "1" to begin the fifth decimal count, none of the capacitors 45, 67, 87 and 107 charge because terminal $\bar{1}$ has a "1" signal impressed thereon. Therefore none of the NORS 13–18 switch when the NORS 11 and 12 switch as the signal at the terminal U changes from "1" to "0" to complete the fifth decimal count. At the end of the fifth decimal count the signals at the terminals 1, $\bar{2}$, 4, and $\bar{2}'$ are "1" and the signals at the terminals $\bar{1}$, 2, $\bar{4}$ and 2′ are "0."

When a signal change at the terminal U from "0" to "1" occurs to begin the sixth decimal count, the capacitor 45 charges because the terminals $\bar{1}$ and 2 each have a "0" signal. The capacitors 67, 87 and 107 are not charged because the terminals $\bar{2}$ and $\bar{2}'$ each have a "1" signal. Thus when the signal at the terminal U changes from "1" to "0" to complete the sixth decimal count, the capacitor 45 will supply a positive signal through the diode 43 to the input 14*b* of the NOR 14 so that the NORS 13 and 14 switch simultaneously with the NORS 11 and 12 to provide a "1" signal at the terminals $\bar{1}$, 2 4 and $\bar{2}'$ and a "0" signal at the terminals 1, $\bar{2}$, $\bar{4}$ and 2′.

When the counter receives a signal change at the terminal U from "0" to "1" to begin the seventh decimal count, none of the capacitors 45, 67, 87 and 107 charge because terminal $\bar{1}$ has a "1" signal impressed thereon. Therefore none of the NORS 13–18 switch when the NORS 11 and 12 switch as the signal at the terminal U changes from "1" to "0" to complete the seventh decimal count. At the end of the seventh decimal count, the signals at the terminals 1, 2, 4 and $\bar{2}'$ are "1" and the signals at the terminals $\bar{1}$, $\bar{2}$, $\bar{4}$ and 2′ are "0."

When a signal change at the terminal U from "0" to "1" occurs to begin the eighth decimal count, the capacitor 87 changes because the terminals $\bar{1}$, $\bar{2}$, $\bar{4}$ and 2′ each have a "0" signal. The capacitors 45, 67 and 107 are not charged because the terminals 2, 4 and $\bar{2}'$ each have a "1" signal. Thus when the signal at the terminal U changes from "1" to "0" to complete the eighth decimal count, the capacitor 87 will supply a positive signal through the diode 83 to the input 18*b* of the NOR 18 so that the NORS 17 and 18 switch simultaneously with the NORS 11 and 12 to provide a "1" signal at the terminals $\overline{1}$, 2, 4, and 2′ and a "0" signal at the terminals 1, $\overline{2}$, $\overline{4}$, and $\overline{2}'$.

When the counter receives a signal change at the terminal U from "0" to "1" to begin the ninth decimal count, none of the capacitors 45, 67, 87 and 107 charge because terminal $\overline{1}$ has a "1" signal impressed thereon. Therefore none of the NORS 13–18 switch when the NORS 11 and 12 switch as the signal at the terminal U changes from "1" to "0" to complete the ninth decimal count. At the end of the ninth decimal count the signals at the terminals 1, 2, 4 and 2′ are "1" and the signals at the terminals $\overline{1}$, $\overline{2}$, $\overline{4}$ and $\overline{2}'$ are "0."

When a signal change at the terminal U from "0" to "1" occurs to begin the tenth decimal count, the capacitor 107 charges because the terminals $\overline{1}$ and $\overline{2}'$ each have a "0" signal. The capacitors 45, 67 and 87 are not charged because the terminals 2, 4 and 2′ each have a "1" signal. Thus when the signal at the terminal U changes from "1" to "0" to complete the tenth decimal count, the capacitor 107 will supply a positive signal through the diode 105 to the input 13*a* of the NOR 13 and through the diode 104 to the input 15*a* of the NOR 15 and through the diode 103 to the input 17*a* of the NOR 17 so that the NORS 13, 14, 15, 16, 17 and 18 switch simultaneously with NORS 11 and 12 to provide a "1" signal at the terminals $\overline{1}$, $\overline{2}$, $\overline{4}$ and $\overline{2}'$ and a "0" signal at the terminals 1, 2, 4 and 2′.

Thus it will be observed that the counter 10 has "counted" up through all ten decimal digits and returned to its initial or zero level. Additional "1" signals at the input terminal U will effect a repetition of the up-counting sequence.

For counting "down" or subtracting, the input "1" signals are applied to the terminal D. In its initial state or zero level, the NORS 12, 14, 16 and 18 are conductive to present a "0" signal at the terminals 1, 2, 4 and 2′ and "1" signals at the terminals $\overline{1}$, $\overline{2}$, $\overline{4}$ and $\overline{2}'$.

During standby conditions before signals to initiate counting in a downward direction are applied to terminal D, the signal at terminal D is "0." Since NOR 11 is nonconductive and NOR 12 is conductive, the "1" output signal of NOR 11 is impressed through the resistor 32 to charge capacitor 37. Also when terminal D has a "0" signal during standby conditions, NOR 12 has a "0" output signal so the capacitor 38 does not receive a charging potential. When the signal at terminal D changes from "0" to "1" to condition the circuits for a count in the downward direction, the capacitor 37 discharges through resistor 31 without any effect on the circuit because the diode 36 prevents the discharge of the capacitor 37 through the NOR 11. Also during the interval when the signal at terminal D continues to be "1," the capacitor 38 charges through the resistor 34 because the output signal of the NOR 12 is "0." The charging of capacitor 38 is in a direction which causes the resistor 34 side of the capacitor 38 to have a positive potential relative to the terminal D side of the capacitor 38. When the input signal at terminal D changes from "1" to "0," thereby completing the count down signal, the charge on the capacitor 38 is supplied as a positive voltage signal through the diode 35 to the input terminal 12*b* of the NOR 12 which causes the NOR 12 to be nonconductive so its output becomes "1" which is supplied to the input terminal 11*b* of the NOR 11 so its output signal changes to "0."

When the counter receives a "0" to "1" signal change at the terminal D to initiate the change in count from the decimal number ten to a decimal number nine, the capacitors 56, 77 and 95 do not charge because of the "1" signal present at the terminals $\overline{2}$, $\overline{4}$ and $\overline{2}'$. The capacitor 118 charges, however, because the terminals 1, 2 and 4 each have a "0" signal impressed thereon. Thus when the signal at the terminal D changes from "1" to "0" to complete the first downward count so the counter will provide signals corresponding to the decimal digit nine, the capacitor 118 will supply a positive signal through the diodes 115, 114 and 113 to the inputs 14*b*, 16*b* and 18*b* of the NORS 14, 16 and 18 so that the NORS 13–18 switch simultaneously with the NORS 11 and 12 to provide a "1" signal at the terminals 1, 2 4 and 2′ and a "0" signal at the terminals $\overline{1}$, $\overline{2}$, $\overline{4}$ and $\overline{2}'$.

When a second downward count signal is supplied to terminal D to change the decimal digit count from nine to eight, during the interval when the signal at the terminal D is "1," the capacitors 56, 77, 95 and 118 are not charged because of the presence of a "1" signal at the terminal 1. Therefore none of the NORS 13–18 switch when the NORS 11 and 12 switch as the signal at terminal D changes from "1" to "0" to complete the downward count from the ninth to the eighth decimal count. At the end of the eighth downward count the signals at the terminals $\overline{1}$, 2, 4 and 2′ will be "1" and the signals at the terminals 1, $\overline{2}$, $\overline{4}$ and $\overline{2}'$ will be "0."

When the counter receives a "0" to "1" signal change at the terminal D to initiate the change in count from the decimal number eight to a decimal number seven, the capacitors 56, 77 and 118 do not charge because of the "1" signal present at the terminals 2′ and 2. The capacitor 95 charges however, because the terminals 1 and $\overline{2}'$ each have a "0" signal impressed thereon. Thus when the signal at terminal D changes from "1" to "0" to complete the downward count so the counter will provide signals corresponding to the decimal digit seven, the capacitor 95 will supply a positive signal through the diode 93 to the input 17*a* of the NOR 17 so that the NORS 17 and 18 switch simultaneously with the NORS 11 and 12 to provide a "1" signal at the terminals 1, 2, 4 and $\overline{2}'$ and a "0" signal at the terminals $\overline{1}$, $\overline{2}$, $\overline{4}$ and 2′.

When the next downward count signal is supplied to terminal D to change the decimal digit count from seven to six, during the interval when the signal at the terminal D is "1," the capacitors 56, 77, 95 and 118 are not charged because of the presence of a "1" signal at the terminal 1. Therefore none of the NORS 13–18 switch when the NORS 11 and 12 switch as the signal at terminal D changes from "1" to "0" to complete the downward count from the seventh to sixth decimal count. At the end of the sixth downward count the signals at terminals $\overline{1}$, 2, 4 and $\overline{2}'$ will be "1" and the signals at the terminals 1, $\overline{2}$, $\overline{4}$ and 2′ will be "0."

When the counter receives a "0" to "1" signal change at the terminal D to initiate the change in count from the decimal number six to a decimal number five, the capacitors 77, 95 and 118 do not charge because of the "1" signal present at the terminals 2 and 4. The capacitor 56 charges, however, because the terminals 1, 2′ and $\overline{2}$ each have a "0" signal impressed thereon. Thus when the signal at terminal D changes from "1" to "0" to complete the downward count so the counter will provide signals corresponding to the decimal digit five, the capacitor 56 will supply a positive signal through the diode 53 to the input 13*a* of the NOR 13 so that the NORS 13 and 14 switch simultaneously with the NORS 11 and 12 to provide a "1" signal at the terminals 1, $\overline{2}$, 4 and $\overline{2}'$ and "0" signal at the terminals $\overline{1}$, 2, $\overline{4}$ and 2′.

When a downward count signal is supplied to terminal D to change the decimal digit count from five to four, during the interval when the signal at the terminal D is "1," the capacitors 56, 77, 95 and 118 are not charged because of the presence of a "1" signal at the terminal 1. Therefore none of the NORS 13–18 switch when the NORS 11 and 12 switch as the signal at terminal D changes from "1" to "0" to complete the downward count from the fifth to fourth decimal count. At the end of the fourth downward count the signals at terminals $\overline{1}$, $\overline{2}$, 4 and $\overline{2}'$ will be "1" and the signals at the terminals 1, 2, $\overline{4}$ and 2′ will be "0."

When the counter receives a "0" to "1" signal change at the terminal D to initiate the change in count from the decimal number four to a decimal number three, the capacitors 56, 95 and 118 do not charge because of the "1" signal present at the terminals $\bar{2}$, $\bar{2}'$ and 4. The capacitor 77 charges however, because the terminals 1, 2 and $\bar{4}$ each have a "0" signal impressed thereon. Thus when the signal at terminal D changes from "1" to "0" to complete the downward count so that the counter will provide signals corresponding to the decimal digit three, the capacitor 77 will supply a positive signal through the diodes 74 and 73 to the inputs 14*b* and 15*b* of the NORS 14 and 15, so that the NORS 13, 14, 15 and 16 switch simultaneously with the NORS 11 and 12 to provide a "1" signal at the terminals 1, 2, $\bar{4}$ and $\bar{2}'$ and a "0" signal at the terminals $\bar{1}$, $\bar{2}$, 4 and 2′.

When a downward count signal is supplied to terminal D to change the decimal digit count from three to two, during the interval when the signal at the terminal D is "1," the capacitors 56, 77, 95 and 118 are not charged because of the presence of a "1" signal at the terminal 1. Therefore none of the NORS 13–18 switch when the NORS 11 and 12 switch as the signal at terminal D changes from "1" to "0" to complete the downward count from the third to the second decimal count. At the end of the second downward count the signals at terminals $\bar{1}$, 2, $\bar{4}$ and $\bar{2}'$ will be "1" and the signals at the terminals 1, $\bar{2}$, 4 and 2′ will be "0."

When the counter receives a "0" to "1" signal change at the terminal D to initiate the change in count from the decimal number two to a decimal number one, the capacitors 77, 95 and 118 do not charge because of the "1" signal present at the terminals 2 and $\bar{2}'$. The capacitor 56 charges, however, because the terminals 1, 2′ and $\bar{2}$ each have a "0" signal impressed thereon. Thus when the signal at terminal D changes from "1" to "0" to complete the downward count so the counter will provide signals corresponding to the decimal digit one, the capacitor 56 will supply a positive signal through the diode 53 to the input 13*a* of the NOR 13 so that the NORS 13 and 14 switch simultaneously with the NORS 11 and 12 to provide a "1" signal at the terminals 1, $\bar{2}$, $\bar{4}$ and $\bar{2}'$ and a "0" signal at the terminals $\bar{1}$, 2, 4 and 2′.

When a downward count signal is supplied to terminal D to change the decimal digit count from one to zero, during the interval when the signal at the terminal D is "1," the capacitors 56, 77, 95 and 118 are not charged because of the presence of a "1" signal at the terminal 1. Therefore none of the NORS 13–18 switch when the NORS 11 and 12 switch as the signal at terminal D changes from "1" to "0" to complete the count from the one to the zero decimal count. When the counter indicates a zero decimal count the signals at terminals $\bar{1}$, $\bar{2}$, $\bar{4}$ and $\bar{2}'$ will be "1" and the signals at the terminals 1, 2, 4, and 2′ will be "0." This is the initial state for the counter 10 and it is thus seen that the counter has subtracted or "counted down" a full decade.

It should be emphasized that the counter 10 does not depend upon sequential operation of the individual stages $2^0$ to $2'^1$. Rather, the stages are switched or shifted simultaneously and at one time, as determined by the associated storage networks SN1–5 to SN0. Thus the counter 10 may count "up" or "down" at any counting level. By way of illustration, it may be assumed that the counter is at the count level of three. In this condition, the NORS 12 and 14 are nonconductive to present a "1" signal at the terminals 1 and 2 while the NORS 16 and 18 are conductive to present a "0" signal at the terminals 4 and 2′. At this count level, the diodes 65 and 66 and the resistor 61 are connected to terminals having a "0" signal. Thus, if a "1" signal is applied to the terminal U for an "up" count, the capacitor 27 produces a positive voltage to render the NOR 11 nonconductive while the capacitor 67 produces a positive voltage to render the NOR 14 conducting and the NOR 16 non-conducting. This presents a "0" signal at the terminals 1, 2 and 2′ with a "1" signal being presented at the terminal 4 which corresponds to the decimal digit four, the next higher decimal digit. However, if an input "1" signal is applied instead to the terminal D for a "count down," only the capacitor 37 is permitted to produce a positive voltage to render the NOR 11 non-conductive. Capacitors 56, 77, 95 and 118 in the associated networks SN2–6, SN4, SN8 and SN0, respectively, because of the "1" signal present at terminal 1 are blocked from charging. In this condition, a "0" signal is presented at the terminals 1, 4 and 2′ while a "1" signal is presented at the terminal 2, which corresponds to the decimal digit two and is seen to be the next lower digit. The counter 10 has the same alternate "count up" or "count down" capability for all other count levels.

The units counter shown in FIGS. 5 and 7 may be coupled with additional similar units counting circuits to provide for counting systems which count to tenths, hundredths, thousandths, etc., as will now be described.

In FIG. 5 a pair of NORS 20 and 21 are connected as a flip-flop to provide a NOR memory. The NOR 20 has a pair of input terminals 20*a* and 20*b* and an output terminal 20*c*. Similarly, the NOR 21 has a pair of input terminals 21*a* and 21*b* and an output terminal 21*c*. The output terminal 20*c* of the NOR 20 is connected to the input terminal 21*b* of the NOR 21 and the output terminal 21*c* of the NOR 21 is connected to an output terminal U′ and to the input terminal 20*b* of the NOR 20. The input terminal 20*a* of the NOR 20 is connected through a diode 201 to the output terminal 9*a* of the network SN–9. Similarly, the output terminal 7*a* of the network SN7 is connected through a diode 202 to the input terminal 21*a* of the NOR 21. The diodes 201 and 202 are connected to conductive positive voltage pulses from the terminals 9*a* and 7*a* to the input terminals 20*a* and 21*a*, respectively, and to block positive voltage signals in the reverse direction.

It will be seen from the chart in FIG. 3 that when the counter 10 switches from the decimal digit seven to the decimal digit eight, a change in the signals from "0" to "1" occurs at terminal 9*a* in FIG. 5 and at terminal 2′ in FIG. 7. Further, when the counter 10 switches from the decimal digit nine to the digit zero, the signals at terminals 9*a* and 2′ change from "1" to "0" when counting in the upward direction. The change in the signal from "0" to "1" at terminal 2′ is controlled by the positive output voltage signal pulse at terminal 7*a* of network SN7. The change in the signal from "1" to "0," as the counter 10 switches from the decimal digit nine to digit zero, is controlled by the network SN9 which supplies a positive voltage signal at the terminal 9*a*.

The NOR memory consisting of the NORS 20 and 21 is initially reset so the NOR 21 is conducting to provide a "0" signal at the terminal U′ and the NOR 20 is nonconductive to supply a "1" input signal to input terminal 21*a*. When the counter 10 switches from the decimal count seven to the decimal count eight, the network SN7 supplies a positive voltage signal through the diode 202 to the input terminal 21*a* of the NOR 21 thereby causing the NOR 21 to become non-conductive so that its output signal at terminal U′ becomes "1."

The terminal U′ is arranged to supply an input to a counter network, not shown, which is similar to the counter network 10 in FIG. 7. The terminal U′ supplies signals to the counter associated therewith in the same manner as the terminal U supplies signals to the counter 10 which was described in connection with FIGS. 5 and 7. It is apparent from the preceding description that a change in the signal from "0" to "1" at terminal U was ineffective to switch the counter 10 and that the presence of a "1" signal at terminal U merely conditions the various circuits of the counter 10 for switching which occurs when the signal at the terminal U changes from "1" to "0." Thus the change in the signal from "0" to "1" at terminal U′ merely conditioned the circuits of the counter associated therewith for switching.

When the counter 10 switches from the decimal count nine to the decimal count zero, the network SN9 supplies a positive voltage signal at the terminal 9*a* which is conducted by the diode 201 to the input terminal 20*a* of the NOR 20. The positive input to terminal 20*a* causes NOR 20 to become non-conductive and the NOR 21 to become conductive, thereby causing the signal at the terminal U′ to change from "1" to "0." When the signal at U′ thus changes from "1" to "0," the circuit networks within the counter to which the terminal U′ supplies an input switch in a manner as previously described depending on the count previously stored within the counter.

Thus if a second or tens counter which is connected to terminal U′, is conditioned to represent a zero count, then the signal change at terminal U′ from "1" to "0" will cause the networks within the counter to switch and indicate a decimal one count. Thus the tens counter will indicate a one count and the unit counter a zero count and the two counters will indicate a total of ten decimal digits.

Further it is apparent that, as succeeding upward count signals are applied to terminal U, the counter 10 networks will continuously switch to reflect the increased counts. As the counter 10 switches from the decimal digit seven count to the decimal digit eight count, the network SN7 will supply a positive voltage signal through diode 202 to the input terminal 21*a* of the NOR 21. This positive input signal to the input terminal 21*a* causes the NORS 20 and 21 to switch so that the signal at terminal U′ again becomes "1." As further successive inputs are supplied at terminal U, the counter 10 will finally switch from hte decimal count 9 to the decimal zero count. At this instant the network SN9 provides a positive voltage signal to diode 201 to the input terminal 20*a* of NOR 20 which causes the NORS 20 and 21 to switch so that the signal at terminal U′ again becomes "0." As previously set forth, the change in this signal from "1" to "0" at terminal U′ causes the tenths counter to switch so the counter will now reflect a two count and the counter 10 a zero count, indicating that the counter has counted twenty pulses which corresponds to the decimal twenty count.

It will be seen that after the network SN7 has switched the NORS 20 and 21 causing NOR 21 to provide a "1" signal, even if the counter 10 is subsequently caused to count in a downwardly direction, the downward counts will not be effective to change the state of the NOR memory which consists of NORS 20 and 21. This result is realized because the only signal which will cause the NORS 20 and 21 to switch after the signal at terminal U′ is "1" occurs when the counter 10 switches from the nine decimal digit count to the zero digit count.

The counter in FIG. 5 is also an arrangement for counting in a downwardly direction from decimal digits greater than nine.

In FIG. 5 a pair of NORS 22 and 23 are connected as a flip-flop to provide a NOR memory. The NOR 22 has a pair of input terminals 22*a* and 22*b* and an output terminal 22*c*. Similarly, the NOR 23 has a pair of input terminals 23*a* and 23*b* and an output terminal 23*c*. The output terminal 23*c* of the NOR 23 is connected to the input terminal 22*b* of the NOR 22 and the output terminal 22*c* of the NOR 22 is connected to an output terminal D′ and to the input terminal 23*b* of the NOR 23. The input terminal 22*a* of the NOR 22 is connected through a diode 203 to the output terminal 8*a* of the network SN8. Similarly, the output terminal 0*a* of the network SN0 is connected through a diode 204 to the input terminal 23*a* of the NOR 23. The diodes 203 and 204 are connected to conduct positive voltage pulses from the terminals 8*a* and 0*a* to the input terminals 22*a* and 23*a* respectively and block positive voltage signals in the reverse direction.

It will be seen from the chart in FIG. 3 that when the counter 10 switches from the digit zero to the decimal digit nine, a change in the signals from "0" to "1" occurs at terminals 9*a* in FIG. 5 and terminal 2′ in FIG. 7. Further, when the counter 10 switches from the decimal digit eight to the decimal digit seven, the signals at terminals 9*a* and 2′ change from "1" to "0" when counting in the downward direction. The change in the signal from "0" to "1" at terminal 2′ is controlled by the positive output voltage signal pulse at terminal 0*a* of network SN0. The change in the signal from "1" to "0" as the counter 10 switches from the decimal digit eight to decimal digit seven is controlled by the network SN8 which supplies a positive voltage signal at the terminal 8*a*.

The NOR memory consisting of the NORS 22 and 23 is initially reset so the NOR 23 is conducting to provide a "0" signal at the terminal 22*b* and the NOR 22 is non-conductive to supply a "1" input signal to input terminal D′. When the counter 10 switches from the decimal zero to the decimal count nine, the network SN0 supplies a positive voltage signal through the diode 204 to the input terminal 23*a* of the NOR 23 thereby causing the NOR 23 to become non-conductive and the NOR 22 to become conductive so that the output signal at terminal D′ becomes "0."

The terminal D′ is arranged to supply an input to a counter network, not shown, which is similar to the counter network 10 in FIG. 7. The terminal D′ supplies signals to the counter associated therewith in the same manner as the terminal D supplies signals to the counter 10 which was described in connection with FIGS. 5 and 7. It is apparent from the preceding description that a change in the signal from "1" to "0" at terminal D is effective to switch the counter 10.

When the counter 10 switches from the decimal count eight to the decimal count seven, the network SN8 supplies a positive voltage signal at the terminal 8*a* which is conducted by the diode 203 to the input terminal 22*a* of the NOR 22. The positive input to terminal 22*a* causes NOR 22 to become non-conductive and the NOR 23 to become conductive, thereby causing the signal at the terminal D′ to change from "0" to "1." When the signal at D′ thus changes from "0" to "1," the circuit networks within the counter are again conditioned for switching when the signal at terminal D′ again changes from "1" to "0" in a manner as previously described, depending on the count previously stored within the counter.

Thus if a second or tens counter which is connected to terminal D′ is conditioned to represent a two count, then the first signal change at terminal D′ from "1" to "0" will cause the networks within the counter to switch and indicate a decimal one count. Thus the tens counter will indicate a one count and the unit counter a zero count and the two counters will indicate a total of ten decimal digits.

Further it is apparent that as succeeding downward count signals are applied to terminal U the counter 10 networks will continuously switch to reflect the decreased counts. As the counter 10 switches from the digit zero count to the decimal digit nine count, the network SN0 will supply a positive voltage signal through diode 204 to the input terminal 23*a* of the NOR 23. This positive input signal to the input terminal 23*a* causes the NORS 22 and 23 to switch so that the signal at terminal D′ again changes from "1" to "0." As previously set forth, the change in this signal from "1" to "0" at terminal D′ causes the tenths counter to switch so the counter will now reflect a zero count and the counter 10 a nine count indicating that the counter has counted down eleven pulses which corresponds to the decimal nine digit count. It is apparent that as further pulses are applied to terminal D, the counter 10 will count downwardly to zero.

It will be seen that after the network SN0 has switched the NORS 22 and 23 so that NOR 23 provides a "0" signal, even if the counter 10 is subsequently caused to count in an upward direction, the upward counts will not be effective to change the state of the NOR memory which consists of NORS 22 and 23. This result is realized because the only signal which will cause the NORS 22 and 23 to switch after the signal at terminal D' is "0" occurs when the counter 10 switches from the zero digit count to the nine decimal digit count.

While certain preferred embodiments of the invention have been specifically disclosed, it is understood that the invention is not limited thereto, as many variations will be readily apparent to those skilled in the art and the invention is to be given the broadest possible interpretation within the terms of the following claims.

What is claimed is:

1. A circuit for counting electrical impulse signals from a source comprising; a plurality of more than two NOR flip-flop logic circuits each arranged to exist in either of two stable states and to supply an output signal indicative of its state, a transfer circuit having an input arranged to receive impulse signals from the source and an output connected to one of the NOR flip-flop circuits for changing the state of the said one flip-flop circuit from one stable state to the other stable state in response to a change in the impulse signal, a plurality of more than two multiple gated storage networks, each of said networks having at least one input connected to receive signals from the impulse signal source and an input connected to receive the output signal of said one flip-flop circuit and another input connected to receive an output from another of said flip-flop circuits, at least one of said networks having an output connected to more than one and less than all of said other flip-flop circuits and operative to change the state of said other flip-flop circuits to which said output is connected in response to a change in the signal from said impulse signal source.

2. A circuit for counting electrical impulse signals from a source comprising; a plurality of more than two NOR flip-flop logic circuits each arranged to exist in either of two stable states and to supply an output signal indicative of its state, a transfer circuit having an input arranged to receive impulse signals from the source and an output connected to one of the NOR flip-flop circuits for changing the state of the said one flip-flop circuit from one stable state to the other stable state in response to a change in the impulse signal, a plurality of more than two multiple gated storage networks, each of said networks having a plurality of inputs with a first input connected to receive signals from the impulse signal source, a second input connected to receive the output signal of said one flip-flop circuit and a third input connected to receive an output from another of said flip-flop circuits, at least one of said networks having an output connected to more than one and less than all of said other flip-flop circuits and operative to change the state of said other flip-flop circuits to which said output is connected in response to a change in the signal from said impulse signal source.

3. A circuit for counting electrical impulse signals from a source comprising; a plurality of more than two NOR flip-flop logic circuits each arranged to exist in either of two stable states and to supply an output signal indicative of its state, a transfer circuit having an input arranged to receive impulse signals from the source and an output connected to one of the NOR flip-flop circuits for changing the state of the said one flip-flop circuit from one stable state to the other stable state in response to a change in the impulse signal, a plurality of more than two multiple gated storage networks, each of said networks having at least one input connected to receive signals from the impulse signal source and an input connected to receive the output signal of said one flip-flop circuit and another input connected to receive an output from another of said flip-flop circuits, at least one of said networks having an output connected to change the state of more than one and less than all of said other flip-flop circuits in response to a change in the signal from said impulse signal source, and another of said networks having an output connected to change the state of all of said flip-flop circuits other than said one flip-flop circuit in response to the output signals of all of said flip-flop circuits and a change in the signal from said impulse signal source.

4. A counter circuit for adding the number of impulse signals from one signal source and for subtracting the number of impulse signals from another signal source comprising; a plurality of more than two NOR flip-flop logic circuits each arranged to exist in either of two states and to supply an output signal indicative of its state, a first transfer circuit having an input arranged to receive impulse signals from the said one signal source, a second transfer circuit having an input arranged to receive impulse signals from said another signal source, said first and second transfer circuits each having an output connected to one of the flip-flop circuits for changing the state of said one flip-flop circuit in response to a change in the impulse signal from either of said sources, and a plurality of more than two multiple gated storage networks each having a first input connected to one of the signal sources and a second input connected to an output of said one flip-flop circuit, each of said networks having an output connected to a flip-flop circuit other than said one flip-flop circuit for changing the state of more than one and less than all of said flip-flop circuits in response to a predetermined change in the signal from the signal source and said one flip-flop circuit.

5. A counter circuit for adding the number of impulse signals from one signal source and for substracting the number of impulse signals from another signal source comprising; a plurality of more than two NOR flip-flop logic circuits each arranged to exist in either of two states and to supply an output signal indicative of its state, a first tranfser circuit having an input arranged to receive impulse signals from the said one signal source, a second transfer circuit having an impulse arranged to receive impulse signals from said another signal source, said first and second transfer circuits each having an output connected to one of the flip-flop circuits for changing the state of said one flip-flop circuit in response to a change in the impulse signal from either of said sources, a first set of more than two multiple gated storage networks each having a first input connected to the said one signal source and a second input connected to an output of the said one flip-flop circuit, a second set of more than two multiple gated storage networks each having a first input connected to the another signal source and another input connected to an output of said one flip-flop circuit, each of said networks of both sets having an output connected to a flip-flop circuit other than said one flip-flop circuit for changing the state of the flip-flop circuit connected thereto in response to a predetermined change in the signal from the signal source connected thereto and said one flip-flop circuit.

6. A circuit for counting electrical impulse signals from a source comprising; a plurality of more than two flip-flop logic circuits each arranged to exist in either of two stable states and supply an output signal indicative of its state, a transfer circuit having an input arranged to receive impulse signals from the source and an output connected to one of the flip-flop circuits for changing the state of the said one flip-flop circuit from one stable state to the other stable state in response to a change in the impulse signal, a plurality of more than two multiple gated networks, each of said networks having at least a first input connected to receive signals from the impulse signal source, a second input connected to receive an output signal from the said one flip-flop circuit and a third input connected to receive an output from a flip-flop circuit other than said one flip-flop circuit, at least one of said networks having an output connected to change the state of only one of said flip-flop circuits in response to a predetermined combination of signals at its inputs, at least a second one of said networks having an output connected to change the state of more than one and less than all of said flip-flop circuits in response to a predetermined combination of signals at its inputs, and at least a third one of said networks having an output connected to change the state of all of said flip-flop circuits except the said one flip-flop circuit in response to a predetermined combination of signals at its inputs.

7. A counter circuit adding the number of impulse signals from one signal source and for substracting the number of impulse signals from another signal source comprising; a plurality of more than two NOR flip-flop logic circuits each arranged to exist in either of two states and to supply an output signal indicative of its state, a first transfer circuit having an input arranged to receive impulse signals from the said one signal source, a second transfer circuit having an input arranged to receive impulse signals from said another signal source, said first and second transfer circuits each having an output connected to one of the flip-flop circuits for changing the state of said one flip-flop circuit in response to a change in the impulse signal from either of said sources, a first set of more than two multiple gated storage networks, each network of said first set of networks having a first input connected to receive signals from the said one impulse signal source, a second input connected to receive an output signal from the said one flip-flop circuit and a third input connected to receive an output from a flip-flop circuit other than said one flip-flop circuit, at least one of said first set of networks having an output connected to change the state of only one of said flip-flop circuits in response to a predetermined combination of signals at its inputs, at least a second one of said first set of networks having an output connected to change the state of more than one and less than all of said flip-flop circuits in response to a predetermined combination of signals at its inputs, and at least a third one of said first set of networks having an output connected to change the state of all of said flip-flop circuits except the said one flip-flop circuit in response to a predetermined combination of signals at its inputs, a second set of more than two multiple gated networks, each of said networks of said second set having at least a first input connected to receive signals from said another impulse signal source, a second input connected to receive an output signal from said one flip-flop circuit and a third input connected to receive an output from a flip-flop circuit other than said one flip-flop circuit, at least one of the networks of said second set having an output connected to change the state of only one of said flip-flop circuits in response to a predetermined combination of signals at its inputs, at least a second one of the networks of said second set having an output connected to change the state of more than one and less than all of said flip-flop circuits in response to a predetermined combination of signals at its inputs and at least a third one of the networks of said second set having an output connected to change the state of all of said flip-flop circuits except the said one flip-flop circuit in response to a predetermined combination of signals at its inputs.

8. In a counter circuit for adding the number of impulse signals received from one signal source and subtracting the number of impulse signals received from another signal source, a plurality of more than two NOR flip-flop logic circuits each arranged to exist in either of two states and to supply an output signal indicative of its state, a first transfer circuit having an input arranged to receive impulse signals from said one signal source, a second transfer circuit having an input arranged to receive impulse signals from said another signal source, said first and second transfer circuits each having an output connected to one of said flip-flop circuits for changing the state of said one flip-flop circuit in response to a change in the impulse signal from either of said sources, a first plurality of more than two multiple gated storage circuits equal in number to the number of said flip-flop circuits and each having a first input connected to be responsive to an impulse signal from said one signal source and a second input connected to be responsive to an output of at least one of said flip-flop circuits, and a second plurality of more than two multiple gated storage networks equal in number to the number of said flip-flop circuits and each having a first input connected to be responsive to an impulse signal from said another signal source and a second input connected to be responsive to an output of at least one of said flip-flop circuits, the improvement which comprises at least two of said networks of said first plurality of networks having their respective first inputs connected to be responsive to impulse signals from said one signal source and having their respective outputs connected to change the state of more than one of said other flip-flop circuits in response to a change in the signal at said one signal source, and at least two of said networks of said second plurality of networks having their first inputs connected to be responsive to impulse signals from said another signal source and having their respective outputs connected to change the state of more than one of said other flip-flop circuits in response to a change in the signal at said another signal source.

9. A first and a second counting circuit for counting electrical impulse signals, each of said counting circuits comprising a plurality of more than two flip-flop circuits each arranged to exist in either of two stable states and to supply an output signal indicative of its state, a transfer circuit having an input arranged to receive said impulse signals and an output connected to one of the flip-flop circuits for changing the state of said one flip-flop circuit from one stable state to the other stable state in response to a change in the impulse signals, a plurality of more than two multiple gated networks, each of said networks having a first input connected to receive said signals, a second input connected to receive an output signal from said one flip-flop circuit and a third input connected to receive an output signal from a flip-flop circuit other than said one flip-flop circuit, a first one of said networks having an output connected to change the state of only one of said flip-flop circuits in response to a predetermined combination of signals at its inputs, a second of said networks having an output connected to change the state of more than one and less than all of said flip-flop circuits in response to a predetermined combination of signals at its inputs, and a third of said networks having an output connected to change the state of all of said flip-flop circuits except said one flip-flop circuit in response to a predetermined combination of signals at its inputs, and means coupling an output of the first counting circuit to the second counting circuit comprising an additional flip-flop logic circuit having an output supplying said impulse signals to be counted to the transfer circuit of the second counting circuit and inputs connected respectively to the outputs of said second and third of said networks of the first counting circuit.

10. In a multiple gated storage circuit for controlling the switching of more than one of a plurality of more than two flip-flop circuits in response to a change in signal from a signal source, each of said flip-flop circuits being operative to exist in either of two stable states and each having an input arranged to cause it to switch from one stable state to the other stable state and an output which supplies a signal indicative of its state, a capacitor, first circuit means connecting one side of the capacitor to the signal source, second circuit means connecting the other side of the capacitor to the inputs of each of more than one of said flip-flop circuits, and third circuit means connecting the other side of the capacitor to the outputs of more than one of said flip-flop circuits, wherein the improvement comprises said first and third circuit means being connected to cause said capacitor ot charge while a signal is at said signal source and said third circuit means presents a potential at the other side of the capacitor unlike that of the signal source, and said second circuit being connected to cause the capacitor to discharge, upon cessation of said signal at said source, into the inputs of the flip-flop circuits to which said second circuit means is connected.

11. A storage circuit as in claim 10 wherein said second circuit means includes diodes interposed between the other side of the capacitor and the respective inputs of the flip-flop circuits to which the second circuit means is connected, and said third circuit means includes diodes interposed between the other side of said capacitor and the respective outputs of some of the flip-flop circuits to which said third circuit means is connected.

12. A storage circuit as in claim 10 wherein said third circuit means includes resistor means interposed between said other side of said capacitor and the outputs of said flip-flop circuits to which said third circuit means is connected.

References Cited

UNITED STATES PATENTS

| | | | |
|---|---|---|---|
| 2,656,106 | 10/1953 | Stabler | 328—44 X |
| 2,735,005 | 2/1956 | Steele | 328—44 |
| 2,985,773 | 5/1961 | Dobbie | 307—88.5 |
| 2,999,207 | 9/1961 | Quynn | 328—44 |
| 3,052,801 | 9/1962 | Kaufman et al. | 307—88.5 |
| 3,059,127 | 10/1962 | Snijders | 307—88.5 |
| 3,104,330 | 9/1963 | Hamilton | 307—88.5 |

ARTHUR GAUSS, *Primary Examiner.*

S. D. MILLER, *Assistant Examiner.*